Oct. 4, 1966 R. C. WARREN 3,276,496
LYE TREATMENT MACHINE
Filed Dec. 30, 1963 2 Sheets-Sheet 2
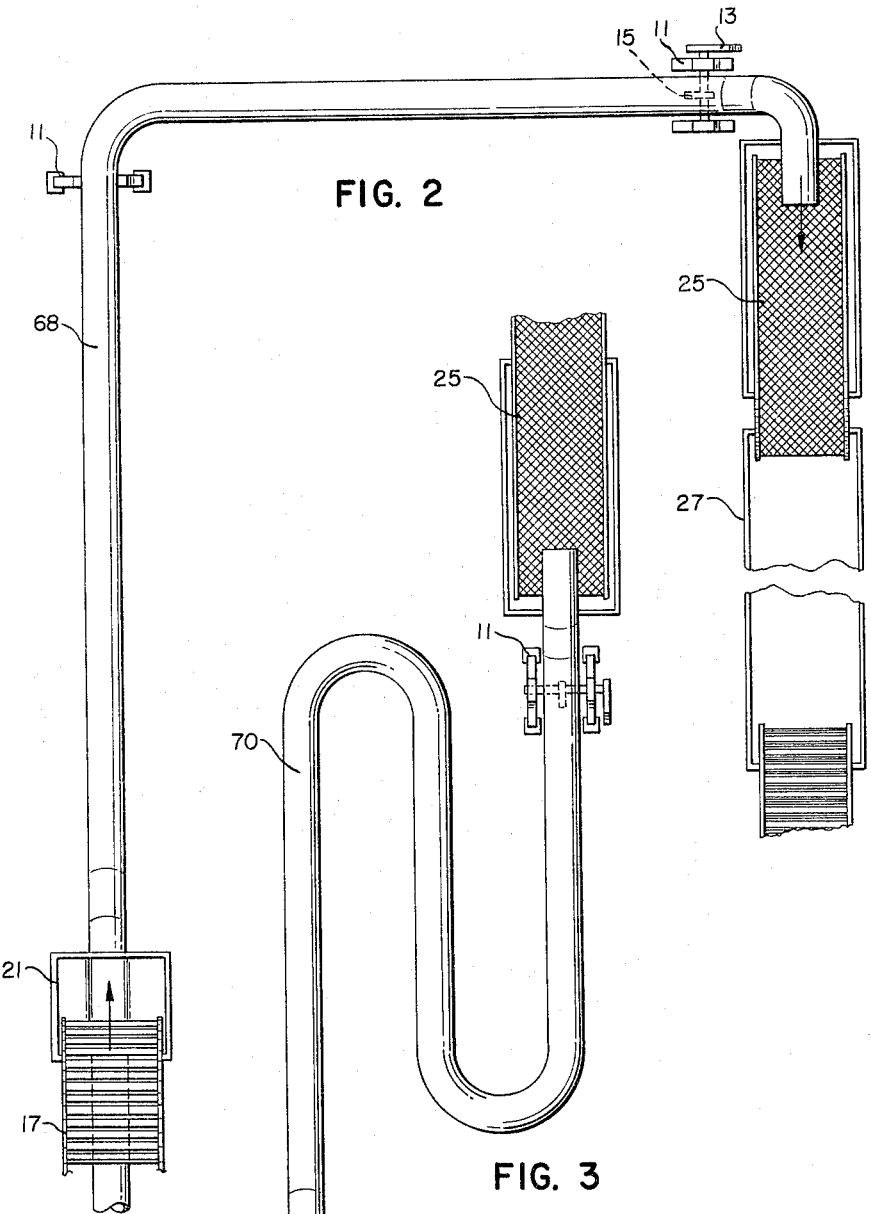
INVENTOR.
RAYMOND C. WARREN
BY
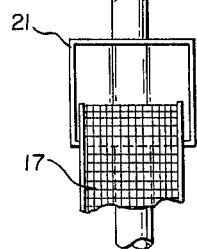
ATTORNEYS

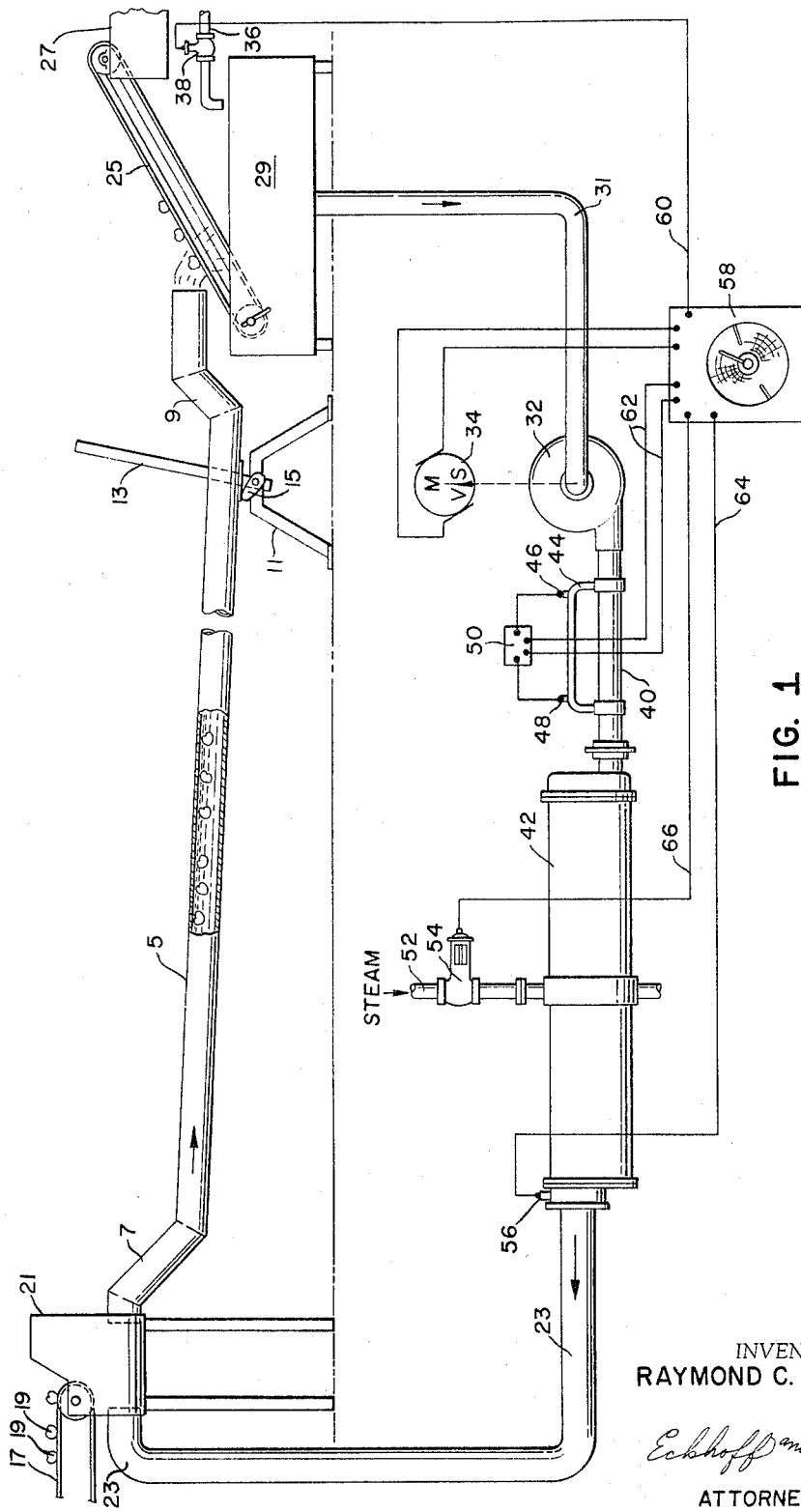

United States Patent Office 3,276,496
Patented Oct. 4, 1966

3,276,496
LYE TREATMENT MACHINE
Raymond C. Warren, Woodland, Calif., assignor to
Carnation Company, a corporation of Delaware
Filed Dec. 30, 1963, Ser. No. 334,099
2 Claims. (Cl. 146—47)

This invention relates to a lye treatment machine and particularly relates to a lye peeler adapted for use in the peeling of tomatoes.

In the processing of many fruits and particularly tomatoes it is common to treat the fruit with a hot lye solution which loosens and splits the skin of the fruit so that it can thereafter be easily removed by slight agitation and/or washing. Such operations have ordinarily been conducted in the past in relatively large equipment which occupies a large amount of plant space. Further, the lye treatment systems used in the past have employed expensive components and frequently have had large open areas contaminating the atmosphere with the fumes from the lye treatment.

In accordance with the present invention, a simple lye treatment device is provided which occupies little floor space and, because of the nature of the treatment chamber, can be wound around in any desired configuration so that it can be folded back on itself or turned around columns or other obstructions. Thus the machine occupies little space and, since the treatment chamber can be wound around in any desired configuration, can frequently utilize space in a plant which would otherwise be wasted. Further, most of the device is fabricated from standard pipe and pipe fittings.

In lye treatment devices heretofore used, the lye solution is passed through an open trough. Since tomatoes tend to float in a lye solution, little or no abrasive action is obtained. In contrast, the device of the present invention uses a tube or pipe filled with lye solution as the treatment chamber so that as the tomatoes flow through the pipe, they abrade against the top of the pipe, loosening the skin and thus speeding up the peeling action.

It is, therefore, an object of the present invention to provide an effective lye treatment system for fruit and the like wherein the lye solution has little exposure to the air.

Another object of this invention is to provide a lye treatment system made of inexpensive components.

Another object of this invention is to provide a lye treatment machine wherein the speed at which the lye solution passes through the machine is easily adjustable.

Still a further object of this invention is to provide a lye treatment machine having a treatment chamber in the form of a pipe which can be turned in various configurations and which occupies a minimum of valuable plant space.

Another object of the invention is to provide a lye treating machine wherein the material being treated is subjected to an abrasive action.

Other objects will be apparent from the balance of the specification which follows.

In the drawings forming a part of this application:

FIGURE 1 is a side view of a lye treatment device embodying the present invention.

FIGURE 2 is a partial plan view of a lye treatment device showing one of several configurations which the device can assume.

FIGURE 3 is another plan view showing another configuration which the device can assume.

Referring now to the drawings by reference characters, the treatment chamber proper comprises a tube 5 having elevated inlet 7 and elevated outlet 9 wherein the main treatment tube 5 is generally horizontal but which has a slight fall, thus the inlet 7 is somewhat higher than the outlet 9. The lower end of the tube 5 rests on a support member 11 having a pivoted arm 13 attached thereto with a cam or eccentric 15 being fastened to the arm and directly supporting the lower end of tube 5. It will be apparent from the drawings that the fall of the tube can be regulated by changing the position of the arm 13. Locking means is provided for holding the arm in a desired position but this means is not shown.

An endless belt 17 delivers tomatoes 19 to an open hopper 21 while a pipe 23 delivers a hot lye solution to the hopper 21. The tomatoes are carried along by the hot lye solution into the inlet 7, through the tube 5, and out through the outlet 9, whereupon they are received by a second endless mesh belt 25 which, if desired, can be an abrasive belt to assist in the ultimate removal of the skin. The tomatoes are then dumped in a hopper 27 from which they are further processed by attrition and washing means well known to those skilled in the art. The lye coming out of the outlet 9, as well as that which drips from the tomatoes through the belt 25, is picked up in the tank 29 and carried by a pipe 31 to a pump 32 for the recirculation of the lye. Pump 32 is preferably provided with a variable speed motor 34 so that the lye can be circulated at the desired rate. A line 36 with solenoid actuated valve 38 delivers make-up lye solution from a source, not shown, to the tank 29 so that the lye solution can be kept up to the desired strength and quantity. After passing through the pump 32, the lye passes through a line 40 to heat exchanger 42, a portion of the lye being diverted through a glass pipe 44 having electrodes 46 and 48 therein which measure the concentration of the lye by determining its resistivity. The resistivity is measured by instrument 50. In heat exchanger 42, steam is introduced from a line 52 from a source not shown through solenoid actuated valve 54 so that the hot lye solution can be maintained at a desired temperature. A thermometer 56 is provided at the outlet of heat exchanger 42 and the lye then passes through the pipe 23 for a repetition of the cycle.

As is shown in the drawings, automatic controls are used in operating the device. Thus, an automatic controller and recorder 58 is provided having a connection 60 for actuating the valve 38 to maintain the lye concentration depending on the reading obtained by the instrument 50, which feeds its information to the controller through the wires 62. Similarly, thermometer 56 is connected through wires 64 to the controller, which in turn actuates valve 54 by means of wires 66. Similarly, the variable speed motor 34 is connected to the controller 58 to maintain the desired flow of lye. This can be set by hand or level or pressure transducers may be employed in the solution.

As has been mentioned before, the treating chamber itself can be of various configurations. Thus, in the configuration shown in FIGURE 2, the chamber generally designated 68 has a U shape while the chamber 70 of FIGURE 3 is shaped like a letter S. It will be understood that these two configurations are for purposes of illustration only and that many different configurations could be used. Thus, the treating chamber can be folded back upon itself to occupy a minimum of space, or it can be twisted around in various configurations to utilize otherwise wasted space, and the like.

It is believed apparent from the foregoing that I have provided a simple yet effective lye treatment machine for tomatoes and the like.

Although this invention is not predicated on any particular sizes, one practical embodiment of the machine employs a treatment chamber made of 8" pipe with a 9" rise at the discharge end and a 19" drop at the hopper. The length was 50 feet. Naturally, the dimensions can be altered, particularly the length, since this is largely determined by the residence time desired for the fruit and the speed at which one forces the fruit out through the treatment chamber by adjusting the fall.

I claim:
1. A machine for lye solution treatment of tomatoes and the like comprising in combination:
 (a) a generally horizontal pipe forming a confined area for directing the flow of the solution;
 (b) an integral inlet end extending above the level of the pipe;
 (c) an integral outlet extending above the pipe, said outlet being lower than said inlet;
 (d) means for causing flow of solution from the inlet of the pipe to the outlet; and
 (e) means for recycling the lye solution through the pipe; and
 (f) an electro for measuring the strength of the lye solution; and
 (g) means for introducing fruit into the flow of solution in the inlet;
 (h) means for removing the fruit from the solution as the fruit is discharged at the outlet.

2. The machine of claim 1 wherein adjustment means are provided whereby the fall of the pipe can be changed.

References Cited by the Examiner
UNITED STATES PATENTS

| | | | |
|---|---|---|---|
| 2,229,610 | 1/1941 | Nicholoy. | |
| 2,616,819 | 11/1952 | Ford | 146—47 X |
| 2,822,842 | 2/1958 | Morici | 146—47 |
| 2,847,334 | 8/1958 | Kilburn et al. | 146—235 |
| 3,093,174 | 6/1963 | Warren | 146—47 |
| 3,115,176 | 12/1963 | Walker | 146—235 |

ROBERT C. RIORDON, *Primary Examiner.*

J. SPENCER OVERHOLSER, *Examiner.*

W. G. ABERCROMBIE, *Assistant Examiner.*